United States Patent [19]

Andre

[11] 4,455,598
[45] Jun. 19, 1984

[54] AUTOMATIC DEVICE FOR COMPENSATION OF AC POLYPHASE POWER LINE VOLTAGE VARIATIONS IN AC-DC CONVERTERS

[75] Inventor: Gèrard Andre, Ecquevilly, France

[73] Assignee: Compagnie Internationale pour l'Informatique CII-Honeywell Bull (Societe Anonyme), Paris, France

[21] Appl. No.: 343,936

[22] Filed: Jan. 29, 1982

[30] Foreign Application Priority Data

Feb. 4, 1981 [FR] France .................................. 81 02085

[51] Int. Cl.³ .......................................... H02P 13/24
[52] U.S. Cl. ...................................... 363/87; 323/300; 363/129
[58] Field of Search ..................... 363/79, 81, 87, 129; 323/300

[56] References Cited

U.S. PATENT DOCUMENTS

| | | |
|---|---|---|
| 3,335,353 | 8/1967 | McVey et al. |
| 3,424,970 | 1/1969 | Ross ....................................... 363/87 |
| 3,564,388 | 2/1971 | Nolf . |
| 3,704,408 | 11/1972 | Schroeder ............................. 363/87 |
| 3,757,230 | 9/1973 | Kenney, Jr. ........................... 328/28 |
| 3,872,374 | 3/1975 | Rasmussen ......................... 323/300 |
| 3,936,675 | 2/1976 | Yoshida ........................... 307/252 F |
| 4,315,305 | 2/1982 | Siemon ............................... 323/300 |

FOREIGN PATENT DOCUMENTS

| | | |
|---|---|---|
| 1564347 | 3/1969 | France . |
| 2195386 | 2/1974 | France . |
| 2212583 | 7/1974 | France . |
| 2002600 | 2/1979 | United Kingdom . |

OTHER PUBLICATIONS

IEEE Transactions on IECI, vol. IECI-27, No. 4; pp. 303-306, Nov. 1980, S1628 0022.
Instrum. & Exp. Tech. (USA), vol. 21, No. 5, PT 2, pp. 1348-1351, Sep./Oct. 1978, S9191 0026.

*Primary Examiner*—William H. Beha, Jr.
*Attorney, Agent, or Firm*—Kerkam, Stowell, Kondracki & Clarke

[57] ABSTRACT

A circuit arrangement for the compensation of voltage variations of the electrical AC polyphase power line for an AC-DC converter (3).

The invention comprises a first circuit (5) for determining the voltage variations at the input of each trigger rectifier ($Th_1$, $Th_2$, $Th_3$) of a converter (3) and a compensating circuit (6) for compensating the firing angle of each trigger rectifier. The compensating circuit (6) is connected to an output (7) of the first circuit (5) for determining the variations in the input voltage of each rectifier. Outputs of the compensating circuit (6) are connected to control inputs of the pulse generator (4) for controlling the firing angle of each rectifier so as to adjust the period of the firing pulses of each trigger rectifier ($Th_1$, $Th_2$, $Th_3$). The invention is particularly applicable to electrical DC power supplys for data processing systems.

5 Claims, 4 Drawing Figures

AUTOMATIC DEVICE FOR COMPENSATION OF AC POLYPHASE POWER LINE VOLTAGE VARIATIONS IN AC-DC CONVERTERS

BACKGROUND OF THE INVENTION

The present invention relates to AC-DC power converters employed especially in the power supply of computers. More particularly, this invention relates to an automatic device or circuit arrangement for compensation of AC polyphase power line voltage variations in "AC-DC" converters.

DESCRIPTION OF THE PRIOR ART

It is known that most AC-DC converters and, in particular, high-power converters include controlled trigger rectifiers known as thyristors. These controlled rectifiers are widely used in electronics, both in regulating DC-motors (e.g., traction engines) and in generating high-power DC-voltages.

In these converters the control of the average rectified voltage is effected by the action of the firing angle of each of the thyristors. This control can be manual (for traction engines) or automatic (e.g., for the power supply of computers). In the case of manual control, the voltage variations of the AC power line are converted by proportional variations of the average rectified voltage. In the case of automatic control, a filtered output voltage is generally compared to a reference voltage and it is held constant by regulating means which act upon the firing angle of each of the thyristors of the converter, variations of the average rectified voltage are compensated by the regulating means which act upon the firing angle of the thyristors within the limits of the speed and the dynamic characteristics of the regulating means. Compensation of AC power line voltage variations at the input effected by sampling the rectified voltage at the converter input and comparing this rectified voltage to a reference voltage is not feasible when these variations have a large amplitude.

SUMMARY OF THE INVENTION

A general object of the invention is to overcome these disadvantages and, in particular, to provide an automatic compensating device or circuit arrangement which ensures the correction of the firing angle of thyristors of the converter as a function of the voltage variations of the electrical power line sampled at the input of each rectifier controlled by the converter. In the case of manual control, this device or circuit ensures the inhibition of the effect of the power variations of the power line on the average rectified voltage. In the case of automatic control, the device or circuit prevents the shifting of the dynamic characteristics of the regulating means and even the suppression thereof by direct control of the firing angle of the thyristors of the converter. Finally, this device or circuit is very simple, consisting only of a very few components.

One broad object of the invention is to provide an automatic device or circuit arrangement for compensating the voltage variations of the AC polyphase power line for an AC-DC converter. This converter includes, for each phase of the power line, at least one trigger rectifier controlled by pulses which ensure the control of the firing angle of each trigger rectifier and which are supplied by a pulse generator with adjustable periods for each phase of the power line. The invention is characterized in that the automatic compensating device or circuit arrangement comprises means for determining the voltage variations at the input of each trigger rectifier, and means for compensating the firing angle of each trigger rectifier, said compensating means being connected to an input of the means for determining the voltage variations of the input voltage of each rectifier. Outputs of these compensation means are connected to control inputs of the pulse generator in order to adjust the period of the firing pulses of each trigger rectifier.

In accordance with another feature of the invention, the means for determining the voltage variations at the input of each trigger rectifier include, for each trigger rectifier, means connected to the power line for rectifying the input voltage, and means for sampling a control voltage having a fraction of the predetermined value of this rectified voltage. The compensating means comprises, for each rectifier, a comparator whose first input is connected to an output of the sampling means which supplies the control voltage. Synchronizing means are connected to the power line and provide at the output, for each trigger rectifier, a line synchronizing signal which is the envelope of the firing pulses of the trigger rectifiers, and which establishes a linear relationship between the variations of the firing angle of each trigger rectifier and the variations of the output voltage thereof. The outputs of the synchronizing means are each connected to second inputs of the comparators, and the output signals of the comparators are applied to the control inputs of the pulse generator to control the adjustment of the period of the trigger pulses of each trigger rectifier.

According to another feature, the means connected to the power line for rectifying the input voltage include, for each phase of the power supply, a transformer whose primary is connected to the corresponding phase of the power line and whose secondary supplies a rectifier bridge. The rectified voltages of the various phases are applied to the sampling means comprised of a circuit consisting of a Zener diode and a series connected current-limiting resistor. The output of the sampling means is taken from a common terminal of two series-connected resistors connected in parallel with the current limiting resistor.

According to another feature, the synchronizing means include, for each phase, a transformer whose primary is connected to the corresponding phase of the power line and whose secondary feeds an integrating circuit by means of a rectifier. Threshold detectors are connected to the outputs of the integrators. The outputs of these threshold detectors form the outputs of the synchronizing means.

According to another feature, the trigger pulse generator includes, for each phase, a threshold-detecting flip flop circuit whose input forms a control input of the generator and whose output is connected to a trigger gate of the corresponding trigger rectifier. The input of this threshold detector is connected to the output of the corresponding comparator of the compensating means.

Finally, according to another feature, the terminal of the current limiting resistor which is not connected to the Zener diode is connected to an input of a voltage error amplifier. Another input of the amplifier receives a fraction of the output voltage of the converter and the output of this amplifier is connected to a control input of the pulse generator.

BRIEF DESCRIPTION OF THE DRAWINGS

Other features and advantages of the present invention will become apparent from the following description and the accompanying drawings, wherein.

DESCRIPTION OF THE PREFERRED EMBODIMENTS

Figure 1:
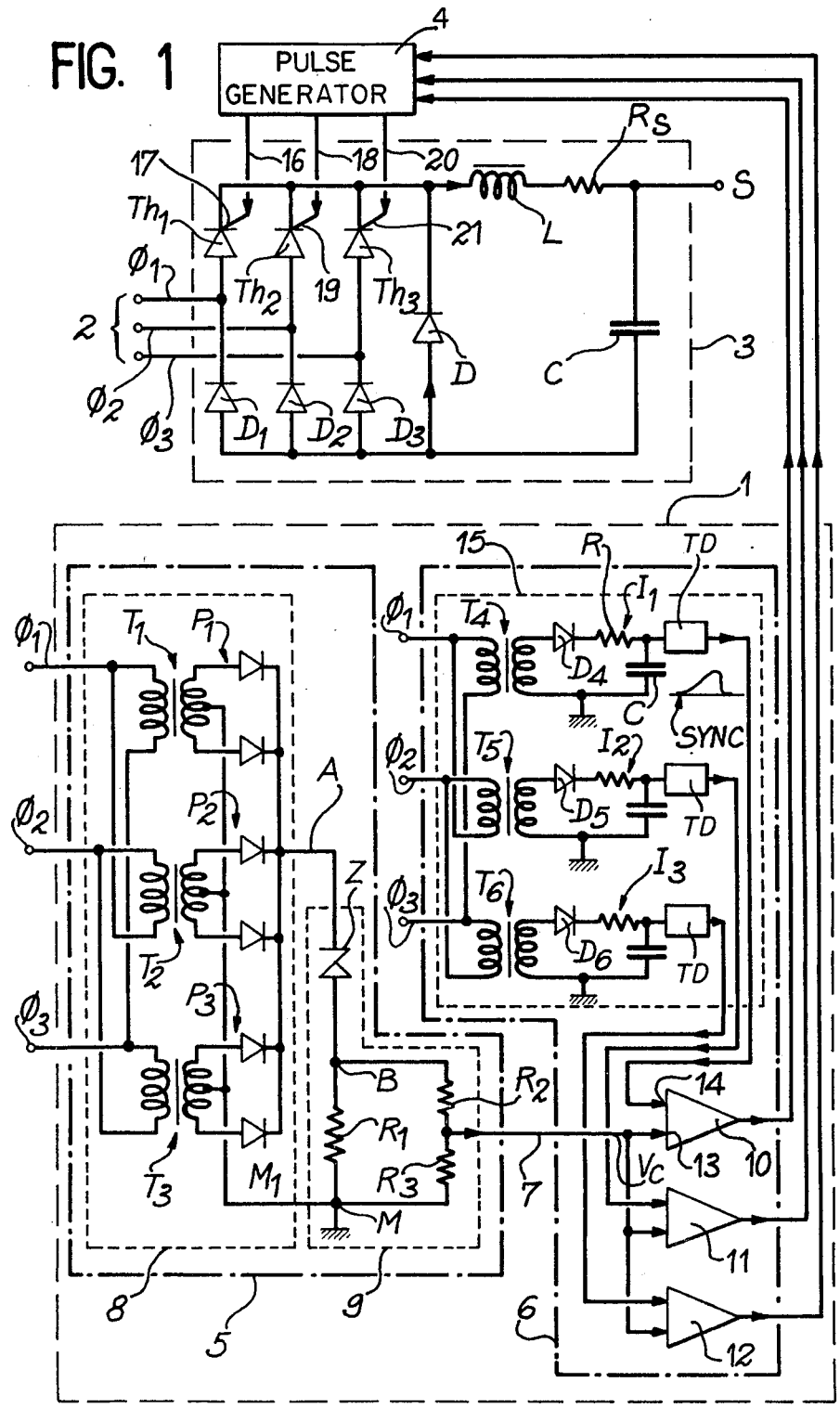
FIG. 1 is a schematic of an automatic compensating device or circuit arrangement in accordance with the invention applied to an AC-DC converter.

FIG. 1 is a schematic of an automatic compensating device or circuit arrangement 1 for compensating for variations in the AC electrical polyphase power line 2 which feeds an AC-DC converter 3. The various phases of the power line are designated by $\phi1$, $\phi2$, $\phi3$. The output of the converter is shown at S. This converter includes in the known manner, for each of the phases of the power line, rectifiers such as, for example, thyristors with pulse-controlled triggering. These thyristors are indicated by $Th_1$, $Th_2$, $Th_3$. The pulses applied thereto by a pulse generator 4 have an adjustable period for each thyristor so as to control the firing angle thereof. In a known manner, each of the thyristors can be associated with a rectifier such as a diode. The diodes for the various phases are indicated by $D_1$, $D_2$, $D_3$. Finally, this converter includes, in the known manner, a booster diode D, a choke coil L which forms a filter and a capacitor C. A resistance $R_S$ is connected in series with the coil to limit the current flowing therein. The rectified voltage is available at the output S of the converter.

The automatic compensating device or circuit arrangement 1 embodying the principles of the invention comprises means 5 for determining the voltage variations at the input of each trigger rectifier ($Th_1$, $Th_2$, $Th_3$) and compensating means 6 for compensating the firing angle of each trigger rectifier. The compensating means 6 are connected to an output 7 of the means 5 for determining the variations in the input voltage. The outputs of the compensating means 6 are connected to control inputs of pulse generator 4 to adjust the period of the triggering pulses of each controlled trigger rectifier, and thereby, to adjust the firing angle of each controlled trigger rectifier.

As will be explained in detail hereinbelow, the means 5, which facilitate the determination of the voltage variations at the input of each rectifier, and the means 6 for compensating the firing angle of each rectifier are connected to each of the phases $\phi1$, $\phi2$, $\phi3$ of AC power supply 2.

The means 5, which facilitates the determination of the voltage variations at the input of each trigger rectifier $Th_1$, $Th_2$, $Th_3$ include, for each of these rectifiers, means 8 connected to power line 2 for rectifying the input voltage and means 9 for sampling a control voltage $V_c$, whose value is a fraction of the rectified voltage at the output of means 8. The compensating means 6 include, for each trigger rectifier, a comparator. The comparators associated with each trigger rectifier are indicated by 10, 11, 12. Each comparator such as, for example, comparator 10 has a first input 13 connected to output 7 of sampling means 9, and a second input 14 connected to an output of synchronizing means 15 forming a part of compensating means 6. The synchronizing means 15 are connected to each of the phases $\phi1$, $\phi2$, $\phi3$ of the AC power supply 2 and provide at the output, for each trigger rectifier of a corresponding phase, a synchronizing signal which, as will be explained hereinbelow, is the envelope of the trigger pulses of the rectifiers. This signal establishes a linear relationship between the variations in the firing angle of each trigger rectifier and the voltage variations in the rectifier output voltage. The output signals of the comparator, 10, 11 and 12 are applied to the control inputs of pulse generator 4 to control the adjustment of the period of the trigger pulses and thereby to control the firing angle of each controlled trigger rectifier.

Means 8, which facilitate the rectification of the input voltage and which are connected to the means 9 for sampling a fraction of this rectified voltage include, for each phase of the power line, a transformer. The transformers are indicated by $T_1$, $T_2$, $T_3$, and each has its primary winding connected to a corresponding one of phases $\phi1$, $\phi2$, $\phi3$ of the power line, while their secondary windings supply full-wave rectifiers $P_1$, $P_2$, $P_3$. The transformers are preferably stepdown transformers.

Sampling means 9 connected to the output of means 8 include a circuit having a Zener diode Z connected in series to a current-limiting resistor $R_1$. Output 7 of the sampling means is taken from the common terminal of two series connected resistors $R_2$, $R_3$, which are in turn connected in parallel across limiting resistor $R_1$.

Synchronizing means 15 include, for each phase, a transformer whose primary is connected to the corresponding phase of the power line and whose seconary supplies an integrating circuit by means of a rectifier. The transformers are designated by $T_4$, $T_5$, $T_6$, while the rectifiers are indicated by $D_4$, $D_5$, $D_6$. The integrating circuits are denoted by $I_1$, $I_2$, $I_3$, and each consists in a known manner of a resistor R associated with a capacitor C. The output of each integrating circuit can be connected to a threshold detector TD to ensure the decrease of the output signal SYNC of this integrator. The outputs of the threshold detectors are connected to the second inputs of the comparators 10, 11, 12.

The trigger-pulse generator 4 for rectifiers $Th_1$, $Th_2$, $Th_3$ of the converter may include, for each phase of the power line, a threshold detecting flip flop circuit (e.g., Schmidt-trigger type) whose input is the input of the generator control and whose output is connected to a trigger gate of the corresponding rectifier of the converter. The input of each of these flip flop circuits is connected to the output of the corresponding comparator of synchronizing means 15.

Thus, for example, in FIG. 1 output 16 of generator 4 is connected to gate 17 of thyristor $Th_1$, while outputs 18, 20 of generator 4 are connected, respectively, to gates 19, 21 of thyristors $Th_2$, $Th_3$.

Figure 2:
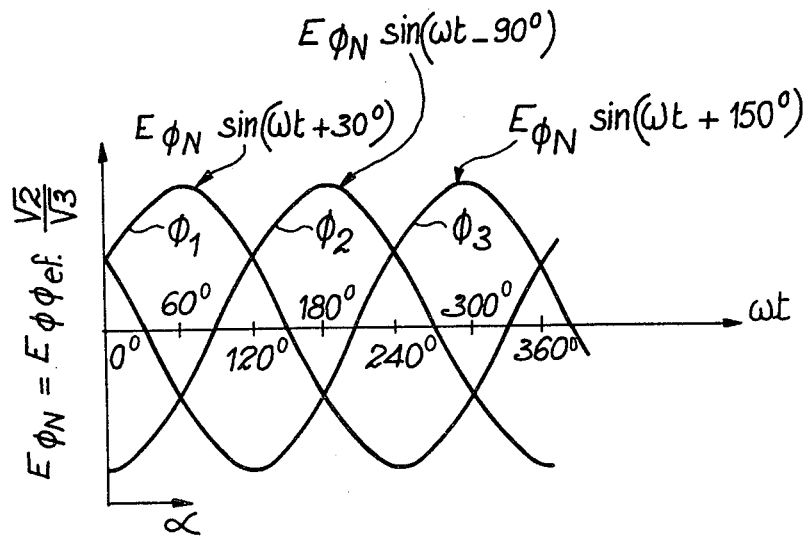
FIG. 2 is a diagram showing the electrical signals of the various phases of the power line applied to the device of the invention and to the converter.

FIG. 2 is a diagram of the signals representing the voltages between the various phases $\phi1$, $\phi2$, $\phi3$ of the supply and the neutral feeder $o_N$ thereof as a function of the angles a=t. The signals representing the various phases are labeled $\phi1$, $\phi2$, $\phi3$, while $E\phi_N$ designates the peak value of the voltage between phase and neutral. This peak value can be expressed by the relation:

$$E\phi_N = E\phi\phi_{ef}(\sqrt{2}/\sqrt{3})$$

($E\phi\phi_{ef}$ designates the effective voltage between the phases).

The value of the voltage at the output S at the voltage drops in the rectifiers and in coil L is given by the relation:

$$Es = \frac{3\sqrt{}}{\pi} \cdot E\phi\phi_{ef} \cdot \frac{1 + \cos a}{2} \quad (1)$$

The various terms of this relation are defined as follows:

$E_s$: average value of the rectified voltage at S in the presence of a resistive charge;
$E\phi\phi_{ef}$: effective voltage between the phases;
a: the delay angle upon firing the thyristors.

For thyristor $Th_1$, a can vary in a range corresponding to $E\phi_1 E\phi_3$.
For thyristor $Th_2$, a can vary in a range corresponding to $E\phi_2 E\phi_1$.
For thyristor $Th_3$, a can vary in a range corresponding to $E\phi_3 E\phi_2$.

The amplitude of the voltage for the various phases $\phi_1, \phi_2, \phi_3$ of the power line is designated by: $E\phi_1, E\phi_2, E\phi_3$.

The instantaneous value of the rectified voltage (at the terminals of the booster diode D) results from the difference between the voltage of the phase corresponding to the conductive thyristor and the voltage of the most negative phase at the same instant.

Figure 3:
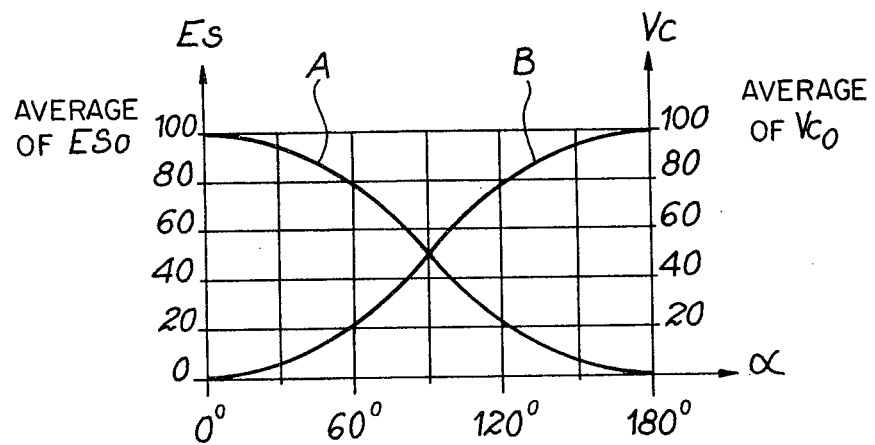
FIG. 3 is a graph which permits a better understanding of the operation of the compensating device of the invention.

FIG. 3 facilitates a better understanding of the operation of the compensating device of the invention.

If the average voltage rectified by a delay angle of zero is denoted by $E_{so}$, it is possible to obtain from the relation (1) cited above the curve A representing the variations of the output voltage $E_3$ as a function of a for a constant value of $E\phi\phi$ (voltage between the phases). This curve has the shape:

$$E_s = E_{so} \cdot \frac{1 + \cos a}{2}$$

If $E_3$ is to be varied linearly by means of the control voltage $V_c$, a variation curve of a as a function of the control and which corresponds to curve B must be established. This curve has the shape:

$$a = \text{arc cos } (1 - 2 V_c/V_{co})$$

For example, considering the control of thyristor $Th_1$ (cf. FIG. 2), the reference marks of synchronism (range in which the firing instant can vary) correspond to the coincidences of the values of $E\phi_1$ and $E\phi_3$ (a=0° and a=180°). Thus, the control of the gate of each thyristor can be established at the instant when the value of the monitoring voltage $V_c$ corresponds to the instantaneous value of a synchronizing signal $V_{co}$, which corresponds to curve B, with an appropriate amplitude. In the device of FIG. 2 the synchronizing signals corresponding to curve B are denoted by SYNC (FIG. 1) and are obtained at the outputs of the threshold detectors DS.

Figure 4:
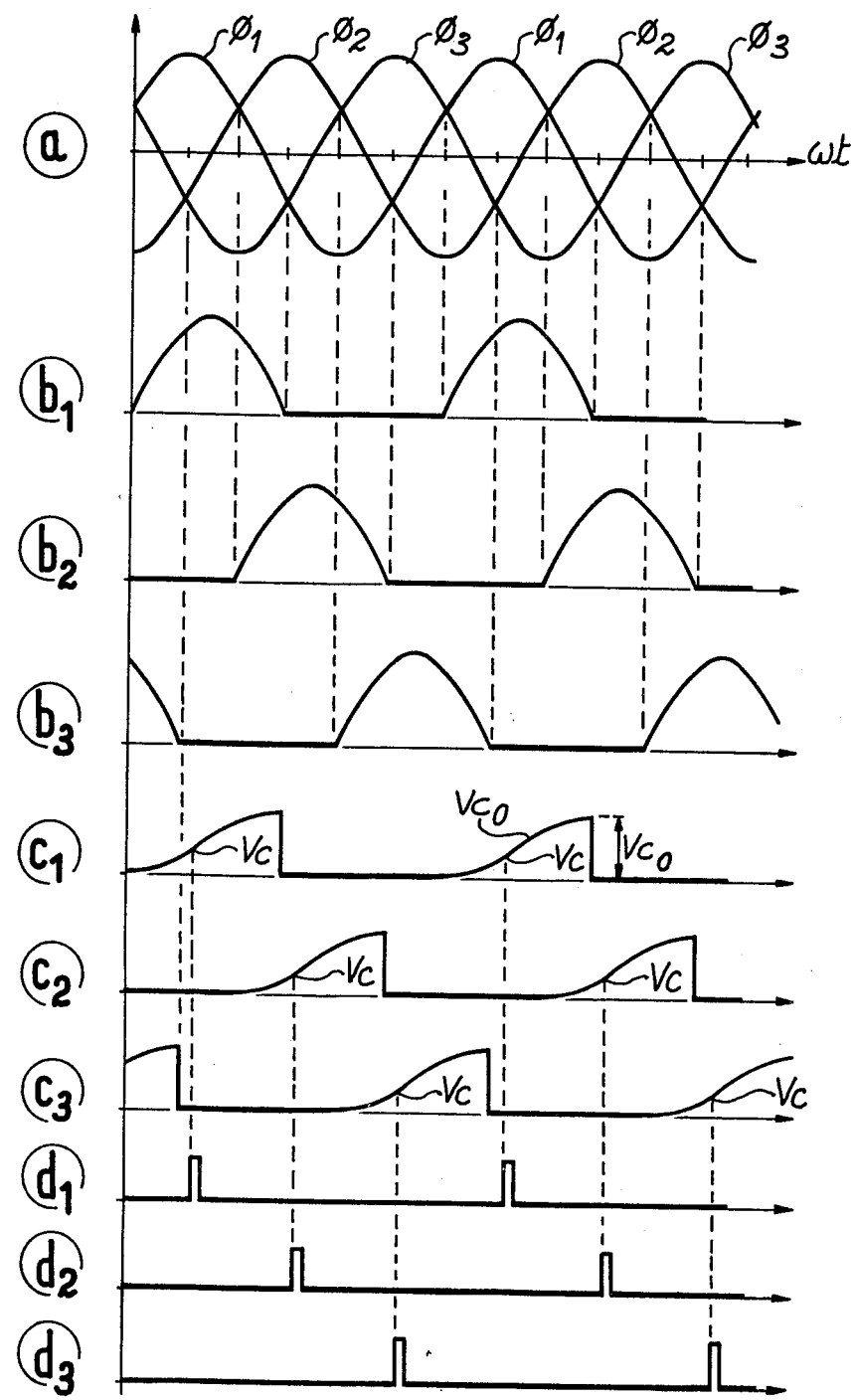
FIG. 4 is a diagram of the signals which can be observed at the outputs of certain points in the circuit arrangement of the invention.

FIG. 4 is a diagram of the various signals appearing as the outputs of certain points in the circuit. Diagram a represents as a function of a−t the voltage variations between phase and zero for the various phases $\phi_1, \phi_2, \phi_3$ of the power supply.

Diagrams $b_1, b_2, b_3$ represent the output signals of each of the thyristors $Th_1, Th_2, Th_3$. In these diagrams each thyristor is conducting during a half-cycle of the input signal.

Diagrams $c_1, c_2, c_3$ represent the synchronizing signals SYNC obtained at the outputs of each of the threshold detectors DS of the synchronizing means 15. In this Figure these signals are indicated by $V_{co}$ and the control voltage obtained at output 7 of sampling circuit 9 is denoted by $V_c$. This is the control voltage which is compared to the output voltage of synchronizing means 15 in order to control the firing angle of the thyristors of the converter.

Finally, diagrams $d_1, d_2, d_3$ represent the pulses from the output of generator 4 applied to, respectively, thyristors $Th_1, Th_2, Th_3$ of converter 3. As mentioned earlier, these pulses can be obtained by applying the output signals of each comparator of compensating means 6 to the respective inputs of the threshold detection flip flop circuits whose outputs control the gates of the corresponding thyristors.

Several numerical results concerning the device in relation to various hypotheses concerning the operation of the device will not be described.

Assume that the intent is to obtain at the output of the converter a voltage which is as constant as possible, whatever the voltage variations in the power supply at the input of the converter may be, and there is a voltage between phases $E\phi\phi$ at the input of the converter and the intent is to obtain a voltage $E_s$ at the output which is lower than $E_{so}$. For the nominal voltage $E\phi\phi_{nom.}$, between phases, a firing angle $a_{nom}$ is obtained.

$$a \text{ nom.} = \text{arc cos } \frac{2\pi \cdot Es}{(3\sqrt{2} \cdot E_{\phi\phi nom.})} - 1$$

If the nominal value of the control voltage $V_c$ is termed $V_{cnom.}$ and the maximum amplitude of the control voltage $V_c$ is termed $V_{conom.}$, then:

$$V_{conom.} = V_{co\cdot nom.} \cdot \frac{1 - \cos a}{2}.$$

Numerical Example

If $E\phi\phi_{.nom} = 208$ V effective and $E_{s.nom.} = 200$ V DC, and if, for example, $V_{co.nom.}$ is chosen to be 5 V, then: $a_{nom.} = 55°.5$ and $V_{c.nom.} = 1.084$ V.

Taking into account the manner in which synchronizing signals are generated, their amplitude $V_{co}$ is proportional to the voltage of the network.

We have seen above how for a given voltage of the power supply, the control voltage $V_c$ could act upon the output voltage $E_s$. Now the influence of $V_c$ will be analyzed when $E\phi\phi$ varies in accordance with various hypothesis.

First Hypothesis $V_c$ is held constant when voltage $E\phi\phi$ between phases varies. The amplitude of the synchronizing signals ($V_{co}$) varies in the same proportion as $E\phi\phi$. With $V_c$ remaining constant, the delay angle a upon firing changes, resulting in a change in the relationship $E_s/E_{so}$ in the same direction and in the same proportion as $E\phi\phi$.

With $E_{so}$ already varying in the same direction and in the same proportion as $E\phi\phi$, output voltage $E_s$ will vary in a ratio:

$$\frac{(E_{\phi\phi})}{E_{\phi\phi\cdot nom}}.2$$

In the numerical example, if $E_{\phi\phi}$ varies by $+10\%$, and thus assumes the value 228.8 V ef, $E_s$ will vary by $+21\%$, or $E_s = 266.2$ V.

Second Hypothesis $V_c$ varies in the same direction and in the same proportion as $E_{\phi\phi}$. The amplitude of the synchronizing signals ($V_{co}$) varies in the same proportion as $E_{\phi\phi}$. If $V_c$ varies in the same proportions and a remains constant, then $E_{s/so}$ will remain constant.

The result is that the output voltage $E_s$ varies in the ratio:

$$\frac{(E_{\phi\phi})}{E_{\phi\phi\cdot nom.}}$$

In the numerical example, if $E_{\phi\phi}$ varies by $+10\%$ and assumes the value 228.8 V ef, $E_s$ will vary by $+10\%$ and assume the value $E_s = 242$ V.

Third Hypothysis

There is a characteristic value of $E_{\phi\phi}$ for which $E_s$.-nom. is obtained when the delay angle a is zero, that is to say, whatever the value of the control voltage $V_c$ may be, if $E_{\phi\phi}$ drops below this characteristic value, $E_s$.nom. can no longer be obtained.

If $V_c$ is zero for this value, $a=0$ and $E_s = E_s$.nom..

The result is that if $E_{\phi\phi}$ varies between this characteristic value and its nominal value, $V_c$ will vary proportionately between 0 and its nominal value and the output voltage will maintain a constant value.

In the numerical example, if $E_s$.nom. $= 220$ V and $E_{\phi\phi .nom.} = 208$ V ef, in order to keep $E_s$ at its nominal value with an angle a of zero (thus, cos $a=1$), $E_{\phi\phi}$ must at least be 200 ($\pi/3\sqrt{2}$) or approximately equal to 163 V ef, or a difference of $-22\%$ in relation to $E_{\phi\phi .nom.}$.

For this value, $V_c = 0$ and when $E_{\phi\phi}$ varies between $-22\%$ and 0, $V_c$ will vary between 0 and 1.084 V, the output voltage will remain constant and equal to 200 V.

This function is easy to obtain by means of the sampling circuit (9) in FIG. 2.

Voltage $V_A$ at output A of full-wave rectifiers $P_1$, $P_2$, $P_3$ is determined in accordance with the requirements by the ratio of the transformation N of transformers $T_1$, $T_2$, $T_3$. It follows proportionately the variations of the voltage network. Let it be assumed for the sake of simplicity that its nominal value is 20.8 V; when $E_{\phi\phi} = 163$ V, voltage $V_A$ at output A is equal to 16.3 V. If $V_z$ (voltage at the terminals of the Zener diode) is 16.3 V, voltage $V_B$ is equal to o for $E_{\phi\phi} = 163$ V, 20.8 V for $E_{\phi\phi} = 208$ V ef., and 22.9 V for $E_{\phi\phi} = 229$ V ef.

If the example described above, the value $R_2$ and $R_3$ is selected in order to obtain a monitoring voltage $V_c = 1.084$ V rating.

Therefore:

$V_{B.nom.} = V_{A.nom.} - V_z = 20.8$ V $- 16.3$ V $= 4.5$ V.

In order to have $V_{c.nom.} = 1.084$ V, $(R_2 - R_3)/R_3 = 4.5/1.084$, or $R_2 = 3.15$ $R_3$ Thus, it is possible by means of an extremely simple device to obtain an excellent performance. Such a device does not exclude the possibility of using an associated regulator consisting in the known manner of a voltage error amplifier. In this case, the tip or end M of resistor $R_3$, instead of being connected to the reference ground, can be connected to an input of the voltage error amplifier not shown herein. This regulator in converters of known construction controls the output voltage of the converter through variations in this output voltage, by acting upon the firing angle of the thyristors. In this case, the voltage at M is used as reference voltage for the voltage error amplifier. This voltage is applied to one of the inputs of this amplifier, while its other input receives a fraction of the output voltage of the triggered rectifiers.

It will be understood that in the present invention several modifications may suggest themselves to these skilled in the art without departing from the spirit of the invention. Accordingly, it is intended by the appended claims to cover all such modifications and therefore resort to the appended claims should be made to appreciate the full scope of the invention.

I claim:

1. A circuit arrangement for the compensation of voltage variations of an AC polyphase electrical power line for an AC-DC converter, comprising a trigger rectifier for each phase of the power line, each trigger rectifier having an input connected to one of the phases of the polyphase power line and adapted to be controlled by trigger pulses which ensure control of the firing angle of the trigger rectifier; a pulse generator having control inputs and associated outputs for supplying said trigger pulses in adjustable periods for each phase of the power line; means for determining the voltage variations at the input of each trigger rectifier, the determining means comprising, for each trigger rectifier, rectifying means connected to the power line for rectifying the input voltage, and sampling means connected to the rectifying means for supplying a control voltage having a fraction of the predetermined value of said rectified voltage; compensating means connected to an output of the determining means for compensating the firing angle of each trigger rectifier, said compensating means comprising, for each trigger rectifier, a comparator having a first input connected to an output of the sampling means which supplies the control voltage, and synchronizing means connected to the power line for supplying a synchronizing signal which forms the envelope of trigger pulses to the trigger rectifiers and which establishes a linear relation between the variations in the firing angle of each trigger rectifier and the variations of the output voltage at the output thereof, the synchronizing means having outputs connected to second inputs of the comparators; and means for applying the output signals of the comparators to control inputs of the pulse generator so as to adjust the period of the trigger pulses applied to each trigger rectifier.

2. A circuit arrangement according to claim 1, wherein the means for determining voltage variations comprises, for each phase of the power line, a transformer having a primary connected to a corresponding phase of the power line and a secondary connected to associated rectifiers for providing rectified voltages the rectified voltages of the various phases provided by said associated rectifiers being applied to the sampling means, said sampling means being formed by a circuit comprising a series connected Zener diode and a current-limiting resistor, and the output of the sampling means being taken at a common terminal between two series-connected resistors connected in parallel across the current-limiting resistor.

3. A circuit arrangement according to claim 2, wherein the synchronizing means comprises for each phase another transformer having a primary connected to a corresponding phase of the power line and a secondary connected to feed an integrating circuit by means of another rectifier, and a threshold detector connected to an output of the integrating circuit, the outputs of said threshold detectors forming the outputs of the synchronizing means.

4. A circuit arrangement according to claim 3, wherein the pulse generator includes for each phase a threshold-detecting flip flop circuit whose input is a control input of the pulse generator and whose output is connected to a trigger gate of a corresponding trigger rectifier, the input of said flip flop being connected to the output of a corresponding comparator of the compensating means.

5. A circuit arrangement according to claim 3, wherein the current-limiting resistor includes a terminal not connected to the Zener diode, said, terminal being connected to an input of a voltage error amplifier said amplifier having another input which receives a fraction of the output voltage of the converter, and the output of said amplifier being connected to a control input of the pulse generator.

* * * * *